Nov. 22, 1966     M. J. GLUCKMAN ET AL     3,286,509
APPARATUS FOR MEASURING WATER VAPOR PERMEABILITY
Filed Sept. 22, 1964     2 Sheets-Sheet 1

INVENTORS
MICHAEL J. GLUCKMAN
HUBERT O. RANGER
ALFRED E. BEECHER
BY Ward, Haselton, McElhannon, Orwa Brooks & Fitpatrick
ATTORNEYS

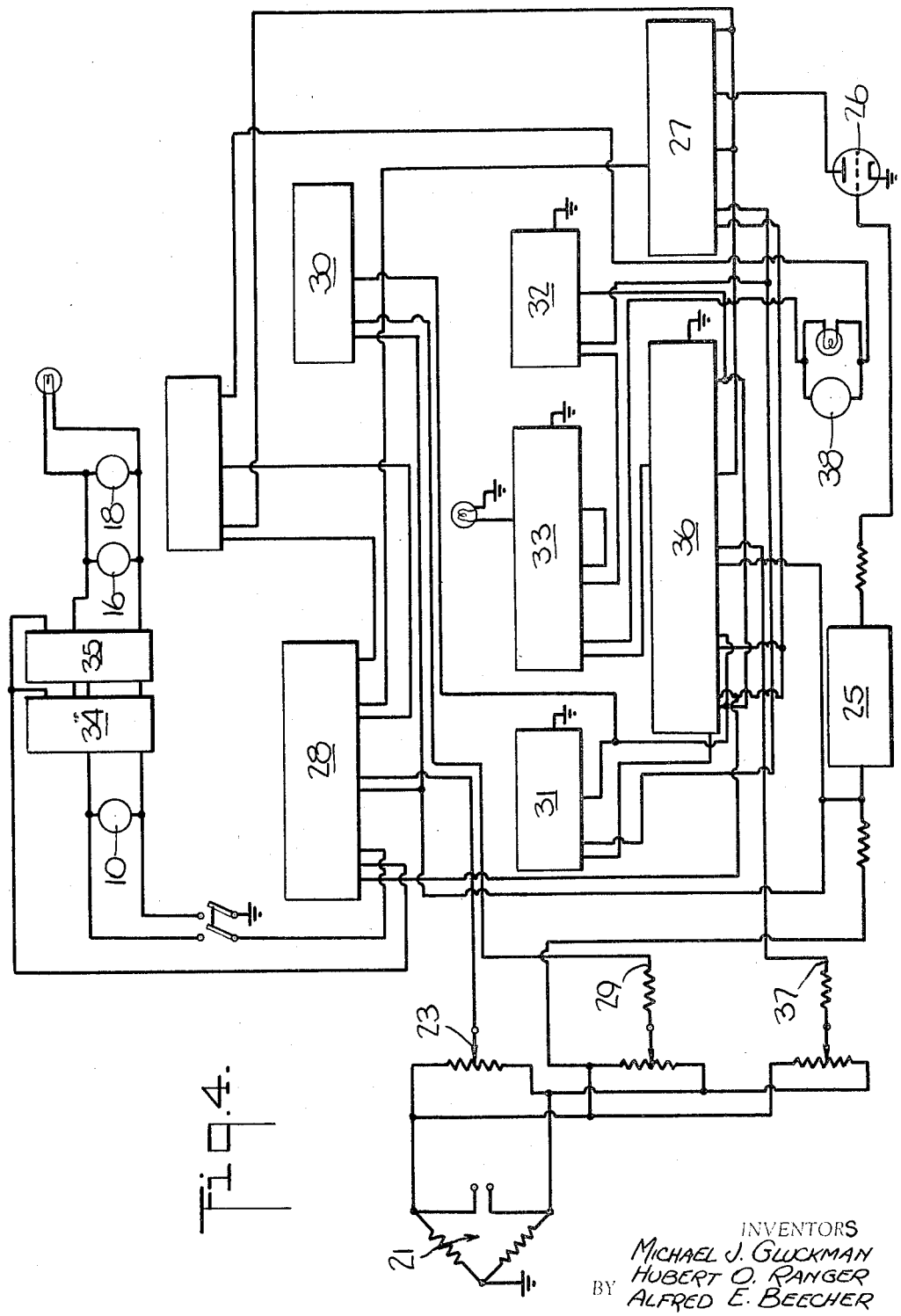

United States Patent Office 3,286,509
Patented Nov. 22, 1966

3,286,509
APPARATUS FOR MEASURING WATER
VAPOR PERMEABILITY
Michael J. Gluckman, New City, and Hubert O. Ranger, Ossining, N.Y., and Alfred E. Beecher, Tacoma, Wash., assignors to St. Regis Paper Company, New York, N.Y., a corporation of New York
Filed Sept. 22, 1964, Ser. No. 398,179
8 Claims. (Cl. 73—38)

This invention relates to apparatus for determining the water vapor permeability of packaging material and more particularly to an accelerated water vapor permeability test apparatus for determining the rate at which water vapor passes through packaging materials.

In the mass merchandising of products today, there is an ever-increasing trend to package products in paper or other substitutes rather than in more expensive material such as metal. In the ever-increasing search for substitute packaging materials, one of the problems which has been encountered is that of determining the water vapor permeability of the packaging material. The need for apparatus to quickly and accurately determine water vapor permeability has become increasingly important because of the importance this test is assuming in the evaluation of packaging materials for new and emergency jobs, and because time limitations do not permit long periods of testing or long drawn out trials in the actual field of service. In consequence, there is a need for a testing apparatus that is accurate, easy to operate and which allows rapid determination of results. The accurate and rapid determination of water vapor permeability is also important in the selection of packaging material which is the least expensive.

The problem of obtaining waterproofness in a packaging material is relatively simple. However, most products are not exposed to the danger of wetting, but are constantly threatened on the shelf with a gain or loss of water in the vapor phase. The damage done by water to a package is very obvious but water vapor, since it is a gas, can make the contents completely unusable. This gaseous or invisible state of water vapor and its universal existence makes the problem of preventing its migration very difficult and has caused much confusion.

One of the methods presently used for determining the water vapor permeability of packaging materials is to cover a metallic test container with the packaging material whose water vapor permeability is to be tested. The base of the test container is filled with calcium chloride or some other moisture absorbent material and the material to be tested is sealed to the container. The test container is then placed in a humidity cabinet and moisture laden air is allowed to circulate over the container having the test material. The test container is then periodically removed and its weight determined, any increase in weight being represented by a gain of water vapor through the packaging material. This prior art method of determining water vapor permeability is described in the November 1942 issue of Modern Packaging and in standard T464-M-45 of the Technical Association of the Pulp and Paper Industries.

This method of determining water vapor permeability has proved unsatisfactory, however, since a minimum of four days is required in order to test the material and it is difficult to duplicate the test because of the variables involved. In addition, a great deal of skill is required in order to perform this test.

Another disadvantage of the prior art apparatus for determining water vapor permeability was that it was not possible to determine the point at which the barrier characteristic of the material being tested changed adversely. The water vapor permeability of a given material changes as temperature changes. At a certain temperature, however, this relationship changes due to derogation of the material insofar as its water vapor barrier characteristic is concerned. It is highly desirable to know the temperature at which this change takes place.

In view of the foregoing it is an object of the present invention to provide an apparatus for measuring the water vapor permeability of packaging material in a relatively short period of time, depending on the barrier characteristics of the material being tested.

Another object of the present invention is to provide apparatus for determining the water vapor permeability of packaging material in which the results attained for a specific sample will not vary by more than small amounts from other tests conducted on the same sample.

A further object of the present invention is to provide a water vapor permeability apparatus in which operating skill does not determine the results achieved.

Yet another object of the present invention is to determine the maximum temperature to which a material may be exposed without adversely affecting the water vapor barrier characteristic.

These and further objects of the invention will appear from the following detailed description of the invention, to be read in conjuction with the accompanying drawings in which similar parts in the several views are identfied by the same reference numeral.

In the drawings:

FIGURE 4 is a schematic diagram of the circuitry for measuring the rate of flow of water vapor through material being tested.

Briefly stated, the apparatus of the present invention for determining the water vapor permeability of packaging material comprises a chamber formed of two cells, which are capable of being sealed from the atmosphere. The sample to be tested is placed between the two cells which are maintained at different relative humidities. The bottom cell is maintained at a relatively high humidity by placing a layer of liquid water in the bottom cell. The top cell is maintained at a relatively low humidity by flushing it with dry air. In this manner, a concentration gradient is formed between the top and bottom cells and water vapor will be transported through the sample being tested from the high to the low humidity cell, thereby resulting in an increase of humidity in the top cell. The rate at which the humidity in the top cell increases is directly proportional to the rate at which water vapor passes through the sample being tested. It is to be noted that as with other gaseous processes, the conditions of temperature and pressure will critically influence the water vapor transmission rate. It is therefore necessary that these vairables be very closely controlled and measured in order to attain meaningful and accurate results.

In the preferred embodiment of the invention, the top and bottom cells are constructed from brass and the outer surface of each cell is covered with heating elements, which allow the temperature of the air inside of the cells to be raised above the ambient temperature. Sensitive thermistors are located inside each of the cells and these thermistors are connected to temperature controllers exterior of the cells in order to permit complete control of the temperatures inside of the cells. Each cell has positioned therein a thermometer which is preferably accurate to within plus or minus 0.25° F., in order to provide precise temperature readings within each cell.

The top cell is provided with a humidity sensing device. This humidity sensing device, which is preferably a moisture sensitive electrical resistance, indicates changes in humidity in the top cell, i.e. as humidity increases, the resistance decreases and as the humidity decreases, the resistance increases.

The top and bottom cells are also provided with means for detecting any pressure differentials between the two cells. It is important to the operation of the present invention that no pressure differenial exists between the top and bottom cells, since the existence of any pressure differential will cause the sample to bulge and possibly rupture, which would result in inaccurate data.

The top and bottom cells are each provided with air inlet and air outlet pipes. In the top cell this provides for flushing the cell with dry air and in the bottom cell makes possible the equalization of pressure.

Figure 1:
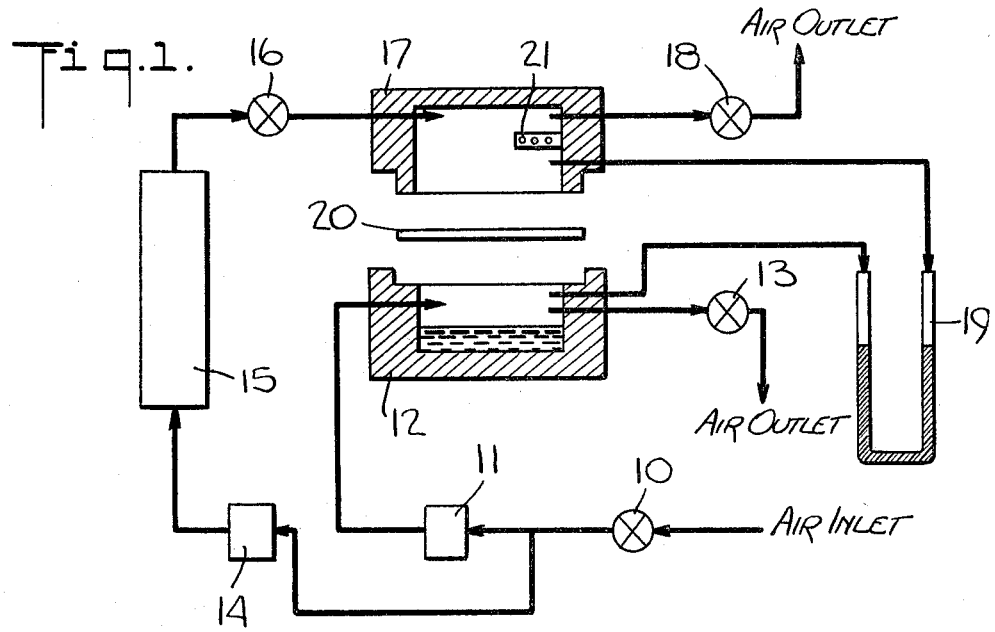
FIGURE 1 is a schematic block diagram of the method and apparatus used to measure water vapor permeability in accordance with the present invention.

Referring now to the figures and particularly to FIGURE 1, there is illustrated a block diagram of the process flow sheet of the present invention. Air enters the apparatus through a normally closed solenoid valve 10 and is broken up into two component streams. One stream goes through a pressure regulating valve 11 into the bottom cell 12. This stream after leaving the bottom cell 12, passes through a manually-operated needle valve 13 and is expelled into the atmosphere.

The second stream of air passes through a pressure reguating valve 14 into an air dryer 15 containing preferably pellet-type molecular sieves. After leaving the dryer 15 the air passes through a normally closed solenoid valve 16, enters the top cell 17 and then passes through the normally closed solenoid valve 18 to the atmosphere. The pressure regulators 11 and 14 and the needle valve 13 are so set that when the solenoid valves 10, 16 and 18 are opened, the differential pressure between the top 17 and bottom 12 cells, as measured by the differential pressure manometer 19, will be less than 1" of water pressure.

The procedure for determining the water vapor permeability of a test sample with the apparatus of the present invention, is to commence the test with the air space in the top cell 17 at a low humidity and the air space in the bottom cell 12 at a high humidity. In this manner, water vapor will transfer through the sample 20, from the bottom cell 12 into the top cell 17, due to the difference in humidities. The rate of increase of water vapor concentration in the top cell 17, i.e. the rate of water vapor transmission through the sample 20, is determined by measuring the rate of humidity increase in the top cell 17. This rate of humidity increase in the top cell 17 is measured by means of the humidity sensing element 21.

Figure 2:
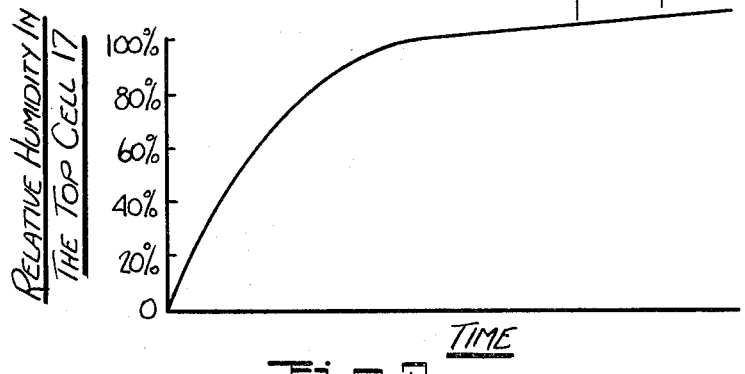
FIGURE 2 is a graphic illustration of the rate of increase of relative humidity in a sealed container such as used in the present invention.

In FIGURE 2, there is illustrated a curve of humidity in the top cell 17 versus time. As indicated in FIGURE 2, at low humidities the rate of humidity increase is extremely rapid. However, as the humidity in the top cell 17 increases, the rate of humidity increase decreases. Therefore, for rapid testing in accordance with the apparatus of the present invention, only a very small portion of the curve illustrated in FIGURE 2 is investigated. The lower the humidity selected at which the test is commenced, the faster will be the test results. However, if the humidity selected is too low, it will become difficult to measure the change in humidity accurately. It has been found that good results can be attained with the apparatus of the present invention if the starting humidity in the bottom cell 12 is bewteen 5 and 25%. As an example if 14% relative humidity is chosen for the top cell 17, the top cell 17 is flushed until the relative humidity in the top cell 17 reaches approximately 12%, i.e. some value lower than 14%. Water vapor then passes through the test sample 20 and the time taken for the relative humidity in the top cell 17 to change from 14 to 16% is recorded. The calculation of the water vapor transmission rate through the sample 20 is accomplished in the following manner.

If the two humidity levels chosen in the top cell 17 are 14% and 16% and the time taken for the humidity in the top cell to change is from 14% to 16% $t'$ minus $t$, the steps in the calculation of the water vapor transmission rate are as follows:

The percentage relative humidity H is defined as:

$$H = 100p/pw \quad (1)$$

where $p$ = partial pressure of water vapor
$pw$ = water vapor pressure at the test temperature
$H$ = percent relative humidity from $$(1) \quad p = Hpw/100 \quad (2)$$

The molar concentration of water vapor in the top cell 17 may be obtained from the following equation:

$$p/P^* - p \quad (3)$$

where $P^*$ = total pressure in the top cell.

To convert the molar concentration of water vapor in the top cell 17 to weight concentration:

$$\text{Gms. of water/gm. of dry air} = \frac{M_H p}{M_A(P^* - p)} \quad (4)$$

where
$M_H$ = molecular weight of water = 18.02
$M_A$ = molecular weight of air = ($\rho$ air × 22.4 liters/mole)
$\rho$ air = 1.2928 gms./liter at standard temperature and pressure Therefore:

$$M_A = 28.98 \text{ and } M_H/M_A = 0.6219 \quad (5)$$

Applying (5) to (4):

$$\text{Gms. water vapor/gm. of dry air} = 0.6219 \frac{p}{P^* - p} \quad (6)$$

Substituting $Hpw/100$ for $p$ in (6) as defined in (2):

$$\text{Gms. water vapor/gm. of dry air} = \frac{0.6219 Hpw}{100P^* - Hpw} \quad (7)$$

Substituting the starting humidity (i.e. 14%) H1 in (7) and the finishing humidity (16%) H2 in (7) and subtracting the form from the latter, determines the increase in the water vapor concentration in the top cell 17, i.e.

Increase in gms. water vapor in top cell/gm. dry air $$= \left[\frac{0.6219 H2pw}{100P^* - H2pw}\right] - \left[\frac{0.6219 H1pw}{100P^* - H1pw}\right] \quad (8)$$

It is assumed that $$(100P^* - H2pw) = (100P^* - H1pw) \quad (9)$$

Substituting (9) in (8):

Increase in gms. water vapor/gm. dry air $$= \left(\frac{0.6219 pw}{100P^* - H1pw} \times\right)(H2 - H1) \quad (10)$$

Now for every one liter of dry air in the top cell 17, there are $p/P^* - p$ liters of water vapor. Therefore, one liter of volume in the top cell contains $$\left[\left(\frac{1}{1 + \frac{p}{P^* - p}}\right)\right] \text{ liters of dry air}$$

$$= \left[\frac{P^* - p}{P^*}\right] \text{ liters of dry air} \quad (11)$$

Substituting $Hpw/100$ for $p$ in (11):

$$\left[\frac{100P^* - Hpw}{100P^*}\right] \text{ liters of dry air} \quad (12)$$

V liters in the top cell contain $$V\left[\frac{100P^* - Hpw}{100P^*}\right] \text{ liters of dry air} \quad (13)$$

Once again assuming $(100P^* - H1pw) = (100P^* - H2pw)$ (13) becomes:

$$V\left[\frac{100P^* - H1pw}{100P^*}\right] \text{ liters of dry air} \quad (14)$$

Now the air density $$= \rho\left(\frac{0.8368P^*}{T}\right) \text{ gms./liter} \quad (15)$$

where $T$ = absolute temperature = $(460 + °\text{F.})$.

The gms. of dry air in the top cell $17 = \rho$ times volume $$= \frac{0.8368P^*V}{T}\left\{\frac{100P^* - H1pw}{100P^*}\right\} \text{ gms. dry air} \quad (16)$$

The amount of water vapor transferred through the sample is obtained by multiplying Equation 10 by Equation 16, i.e.

$$= \left\{\frac{0.8368VP^*}{T}\right\}\left\{\frac{100P^* - H1pw}{100P^*}\right\}\left\{\frac{0.6219pw}{100P^* - H1pw}\right\}\{H2 - H1\} = \left(\frac{0.8368V}{T}\right)\left(\frac{0.6219pw}{100}\right)(H2 - H1) \quad (17)$$

This is the transmission rate for a 5-inch diameter sample in $(t' - t)$ seconds.

To convert this result to a transmission rate per 100 square inches per 24 hours, multiply (17) by:

$$\frac{400}{25\pi} \times \frac{86,400}{t' - t} = \frac{1,382,400}{\pi(t' - t)} \quad (18)$$

$(17) \times (18)$

WVTR $$= \frac{1,382,400 \times 0.8368 \times 0.6219 \times V \times pw \times (H2 - H1)}{\pi \times 100 \times T \times (t' - t)}$$

or $$WVTR = \frac{2288Vpw(H2 - H1)}{T(t' - t)}$$

gms. water/100 sq. inches/24 hours.

In water vapor transmission, for every degree Fahrenheit increase in temperature, the rate of water vapor transmission increases by almost 10%. Therefore, for every 10° F. temperature increase, the rate of water vapor transmission will almost double. The apparatus of the present invention utilizes this phenomena and utilizes high temperature testing for increased speed.

Figure 3:
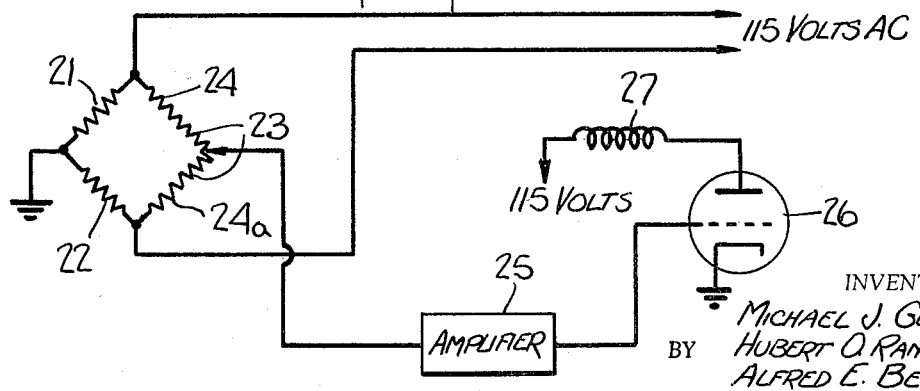
FIGURE 3 is a schematic block diagram of a portion of the circuitry used for measuring the rate of flow of water vapor through material being tested.

The apparatus of the present invention is controlled by means of the circuit illustrated in FIGURE 3. As previously stated, the relative humidity in the top cell 17 is measured by means of a moisture sensitive resistance 21, i.e. the resistance of the probe 21 changes as the humidity in the top cell 17 changes. The circuit illustrated in FIGURE 3 operates in the following manner.

A Wheatstone bridge is formed by the variable resistance probe 21, a 1.5-megohm resistor 22, and a 20,000-ohm precision potentiometer 23. The potentiometer forms two legs of the bridge, one leg 24 having a resistance R and the other leg 24a having a resistance of 20,000 ohms minus R.

Theoretically, if all of the resistors 21, 22, 24 and 24a are pure resistances without any capacitance, a balance will be achieved in the bridge under the following conditions.

$$\text{Probe} \times (20,000 - R) = 1,500,000R$$

$$R = \frac{20,000 \times \text{Probe}}{1,500,000 + \text{Probe}} \text{ ohms}$$

As the bridge goes through the balance or null point due to the changing resistance of the probe 21, the error signal will go through a change of phase of 180°. This error signal phase change is amplified by the amplifier 25 and is transmitted to a gas-filled thermionic thyratron 26. A thyratron is basically an electronic switch, such that when the grid and plate voltages are dissimilar or both negative, the tube will not conduct. However, when both the grid and the plate voltages become positive, the tube 26 will fire and the gas will become ionized, thus making the tube 26 a conductor.

The coil of relay 27 is connected to the plate of the thyratron 26, such that when the thyratron 26 is conducting relay 27 is in the normally open position and when the thyratron 26 is not conducting relay 27 is in the normally closed position. As illustrated in FIGURE 4, relay 27 is also connected to a number of other relays, so that a number of different functions may be performed when the thyratron 26 fires. Upon initiation of the test the thyratron 26 is in the normally fired or conducting condition. When the potentiometer 23 has balanced the bridge, the thyratron 26 ceases conducting, and the potentiometer 23 is automatically removed from the bridge circuit by virtue of the solenoid hold-down switch 28 opening and the potentiometer 29 is put into the bridge circuit through the relay 30. Relays 31, 32 and 33 constitute a thermal locking circuit for relay 27. The relays 34 and 35 provide an opening and thermally delayed closing circuit for solenoid valves 10, 16 and 18.

The apparatus and circuits illustrated in FIGURES 1, 3 and 4 operate in the following manner.

The solenoid hold-down switch 28 is initially closed. This closes relays 34 and 35 and opens all three solenoid air valves 10, 16 and 18, thereby allowing dry air to flush through the top cell 17. The humidity in the top cell 17 accordingly drops, and when it reaches a value that has been pre-set on the first potentiometer 23, the bridge passes through a null. The thyratron 26 is then in the fired or conducting position with relay 27 closed. As the phase changes, the thyratron 26 becomes non-conducting and relay 27 opens. As soon as relay 27 opens, valve 10 is immediately closed and valves 16 and 18 will close seconds later due to the thermal delay relay 35. This allows the pressure in the top cell 17 to drop to atmospheric pressure. In addition, the first potentiometer 23 is removed from the bridge and it is replaced by the second potentiometer 29.

As the test continues, the humidity in the top cell 17 increases as water vapor is transmitted through the sample 20. When the humidity in the top cell 17 reaches a level that has been pre-set on the second potentiometer 29, such, for example, as 14 percent, the bridge again passes through a null, the thyratron 26 once again fires and again becomes conductive. In rapid succession relay 36 closes and relay 30 opens. This disconnects the second potentiometer 29 from the bridge and replaces it with the third potentiometer 37. The resulting bridge on balance causes the thyratron 26 to become non-conducting and relay 27 opens once again, which supplies power to the timer 38.

The humidity in the top cell 17 continues to rise and when it reaches the pre-set value on the third potentiometer 37, such, for example, as 16 percent, the thyratron 26 fires, thereby becoming conductive and closing relay 27. This stops the timer 38 and completes the test.

At the completion of the test the timer 38 indicates the time required for the humidity in the top cell to have risen from 14 to 16 percent. Once this is known, the water vapor permeability of the sample under test can be determined from the formula given above.

While there has been shown what is considered to be a preferred embodiment of the invention, it is to be understood that many changes and modifications may be made therein without departing from the essential features of the invention. For example, in the appended claims the terms top and bottom cells are used but are not to be construed as limiting the invention to a fixed physical relationship with the top cell immediately above the bottom

We claim:

1. Apparatus for determining the water vapor permeability of a given material, said apparatus comprising top and bottom cells adapted to be interconnected to form an air-tight chamber therebetween, said material whose water permeability is to be determined being positioned in said chamber between said top and bottom cells whereby water vapor passing from one of said cells to the other must pass through said material, means for regulating the relative humidity in said cells whereby the relative humidity in said bottom cell is higher than the relative humidity in said top cell, means for measuring changes in relative humidity in said top cell, and means for measuring the time required for the relative humidity in said top cell to increase from one value to another due to the passage of water vapor from said bottom cell through said material to said top cell whereby the water vapor permeability of said material can be determined.

2. Apparatus for determining the water vapor permeability of a given material, said apparatus comprising top and bottom cells adapted to be interconnected to form a chamber therebetween sealed from the atmosphere, said material whose water permeability is to be determined being positioned in said chamber between said top and bottom cells whereby water vapor passing from one of said cells to the other must pass through said material, means for selectively passing air through said top and bottom cells to regulate the relative humidity in said cells whereby the relative humidity in said bottom cell is higher than the relative humidity in said top cell, means for measuring changes in relative humidity in said top cell, and means for measuring the time required for the relative humidity in said top cell to increase from one value to another due to the passage of water vapor from said bottom cell through said material to said top cell whereby the water vapor permeability of said material can be determined.

3. Apparatus for determining the water vapor permeability of a given material, said apparatus comprising top and bottom cells adapted to be interconnected to form a chamber therebetween sealed from the atmosphere, said material whose water permeability is to be determined being positioned in said chamber between said top and bottom cells whereby water vapor passing from one of said cells to the other must pass through said material, means for selectivity passing air through said top and bottom cells, dryer means for drying the air entering said top cell whereby the relative humidity in said top cell is lower than the relative humidity in said bottom cell, means for measuring changes in relative humidity in said top cell, and means for measuring the time required for the relative humidity in said top cell to increase from one value to another due to the passage of water vapor from said bottom cell through said material to said top cell whereby the water vapor permeability of said material can be determined.

4. Apparatus for determining the water vapor permeability of a given material, said apparatus comprising top and bottom cells adapted to the be interconnected to form a chamber therebetween sealed from the atmosphere, said material whose water permeability is to be determined being positioned in said chamber between said top and bottom cells whereby water vapor passing from one of said cells to the other must pass through said material, a layer of water in the bottom of said bottom cell, means for selectivity passing air through said top and bottom cells, dryer means for drying the air entering said top cell whereby the relative humidity in said top cell is lower than the relative humidity in said bottom cell, means for measuring changes in relative humidity in said top cell, and means for measuring the time required for the relative humidity in said top cell to increase from one value to another due to the passage of water vapor from said bottom cell through said material to said top cell whereby the water vapor permeability of said material can be determined.

5. Apparatus for determining the water vapor permeability of a given material, said apparatus comprising top and bottom cells adapted to be interconnected to form a chamber therebetween sealed from the atmosphere, said material whose water permeability is to be determined being positioned in said chamber between said top and bottom cells whereby water vapor passing from one of said cells to the other must pass through said material, a layer of water in the bottom of said bottom cell, means for maintaining the pressure in said top and bottom cells substantially equal, means for selectivity passing air through said top and bottom cells, dryer means for drying the air entering said top cell whereby the relative humidity in said top cell is lower than the relative humidity in said bottom cell, means for measuring changes in relative humidity in said top cell, and means for measuring the time required for the relative humidity in said top cell to increase from one value to another due to the passage of water vapor from said bottom cell through said material to said top cell whereby the water vapor permeability of said material can be determined.

6. Apparatus for determining the water vapor permeability of a given material, said apparatus comprising top and bottom cells adapted to be interconnected to form a chamber therebetween sealed from the atmosphere, said material whose water permeability is to be determined being positioned in said chamber between said top and bottom cells whereby water vapor passing from one of said cells to the other must pass through said material, a layer of water in the bottom of said bottom cell, means for maintaining the pressure in said top and bottom cells substantially equal, means for maintaining the temperature in said top and bottom cells substantially equal, means for selectivity passing air through said top and bottom cells, dryer means for drying the air entering said top cell whereby the relative humidity in said top cell is lower than the relative humidity in said bottom cell, means for measuring changes in relative humidity in said top cell, and means for measuring the time required for the relative humidity in said top cell to increase from one value to another due to the passage of water vapor from said bottom cell through said material to said top cell whereby the water vapor permeability of said material can be determined.

7. Apparatus for determining the water vapor permeability of a given material in accordance with claim 6 wherein the temperature in said top and bottom cells is maintained substantially above the ambient temperature in order to accelerate the passage of water vapor through said material being tested.

8. Apparatus for determining the water vapor permeability of a given material in accordance with claim 7 wherein said means for measuring changes in the relative humidity in said top cell comprises a resistor whose resistance changes proportionally with changes in relative humidity.

References Cited by the Examiner
UNITED STATES PATENTS 2,904,996  9/59  Lamb et al. _____ 73—73

LOUIS R. PRINCE, *Primary Examiner.*

DONALD O. WOODIEL, *Assistant Examiner.*

UNITED STATES PATENT OFFICE
CERTIFICATE OF CORRECTION

Patent No. 3,286,509

November 22, 1966

Michael J. Gluckman et al.

It is hereby certified that error appears in the above numbered patent requiring correction and that the said Letters Patent should read as corrected below.

Column 2, line 62, for "vairables" read -- variables --; column 4, line 60, equation 10 should appear as shown below instead of as in the patent:

$$= \left( \frac{0.6219pw}{100P^* - H1\ pw} \right) \times (H2 - H1)$$

column 7, lines 48 and 68 and column 8, lines 18 and 42, for "selectivity", each occurrence, read -- selectively --.

Signed and sealed this 12th day of September 1967.

(SEAL)
Attest:

ERNEST W. SWIDER
Attesting Officer

EDWARD J. BRENNER
Commissioner of Patents